United States Patent [19]
Baldwin et al.

[11] Patent Number: 5,533,348
[45] Date of Patent: Jul. 9, 1996

[54] AVERAGE AIR TEMPERATURE SENSOR

[75] Inventors: Joe M. Baldwin; Dale C. Cotton, both of Clarksville, Tenn.

[73] Assignee: American Standard Inc., Piscataway, N.J.

[21] Appl. No.: 296,850

[22] Filed: Aug. 26, 1994

[51] Int. Cl.⁶ .................................................. F25B 49/02
[52] U.S. Cl. ........................ 62/129; 236/DIG. 19; 374/116; 374/135; 374/138
[58] Field of Search ............................ 62/126, 127, 129; 236/DIG. 19; 374/110, 115, 116, 135, 138, 147, 148

[56] References Cited

U.S. PATENT DOCUMENTS

| | | | |
|---|---|---|---|
| 3,136,160 | 6/1964 | Randall | 374/116 |
| 4,044,612 | 8/1977 | Powell | 374/135 X |
| 4,265,115 | 5/1981 | Stuhr | 73/349 |
| 4,353,409 | 10/1982 | Saunders et al. | 165/2 |
| 4,501,125 | 2/1985 | Han | 62/175 |
| 4,547,079 | 10/1985 | Alamprese et al. | 374/116 |
| 4,623,090 | 11/1986 | Heger | 236/DIG. 19 |
| 4,679,411 | 7/1987 | Pearse, Jr. | 62/519 |
| 4,838,484 | 6/1989 | Kreuter | 236/49 |
| 5,226,729 | 7/1993 | Alford | 374/115 |
| 5,324,229 | 6/1994 | Weisbecker | 454/233 |

FOREIGN PATENT DOCUMENTS

| | | | |
|---|---|---|---|
| 295234 | 10/1991 | Germany | 374/138 |
| 56-095714 | 8/1981 | Japan . | |
| 58-96934 | 6/1983 | Japan | 236/DIG. 19 |
| 61-241633 | 10/1986 | Japan . | |
| 1147931 | 3/1985 | U.S.S.R. | 374/138 |
| 734702 | 8/1955 | United Kingdom | 374/148 |

*Primary Examiner*—Harry B. Tanner
*Attorney, Agent, or Firm*—William J. Beres; Peter D. Ferguson; William O'Driscoll

[57] ABSTRACT

An average temperature sensor designed for use in an air conditioning unit, wherein the air conditioning unit has a high pressure region and a low pressure region and a method for making an average temperature measurement. The average temperature sensor senses the average temperature of air flowing in the high pressure region and comprises a device for conveying a flow of air that is in fluid communication with the high pressure region. A temperature sensor is disposed in a temperature sensing relationship to the device for conveying the flow or air. The high pressure in the high pressure region induces a flow of air in the device for conveying a flow of air. This flow of air flows from the high pressure region to the low pressure region and is at the average temperature of the air in the high pressure region. The device for conveying the flow of air includes a plurality of air inlets selectively disposed within the high pressure region to receive a sample flow of air that has a temperature that is representative of the average temperature of the air flowing in the high pressure region.

25 Claims, 5 Drawing Sheets

AVERAGE AIR TEMPERATURE SENSOR

TECHNICAL FIELD

The present invention relates generally to air conditioning systems for buildings. More particularly it pertains to a supply air temperature sensor capable of sensing the average temperature of the supply air being supplied to a heating or cooling zone. In alternate embodiments, the location of the sensor can be shifted to measure outside air temperature. In further alternative embodiments, humidity, carbon dioxide or indoor air quality sensors may be substituted for or combined with the air temperature sensor.

BACKGROUND OF THE INVENTION

So called "roof top" air conditioning systems have steadily evolved since their introduction in the 1960's for heating and cooling of commercial buildings. Roof top units are characterized as forced air units that distribute the conditioned air (either heated or cooled) by means of fans, through supply ducts, to each of the ventilated zones of a building. The systems are semi-closed loop systems in the sense that conditioned air is circulated to the zones of a building to cool or heat the zones, and then is returned by return ducts to the heating or refrigeration system to be heated or cooled and recirculated to the zones. Outdoor ambient air may be admitted for cooling purposes or to maintain an adequate indoor air quality, as will be further explained.

The most recent roof top designs are variable air volume (VAV) systems. VAV systems are designed to operate at a constant supply air temperature, for example, 55° F. The volume of the supply air provided to the ventilated zones of the building is varied in order to satisfy particular cooling or heating requirements, but the temperature of the air is maintained constant. On a hot day or when the zones are fully occupied by people, a high volume of cooled air at 55° F. would be needed to satisfy the cooling requirements. On a cool day or when few people are occupying the building, a substantially reduced volume of cooled air at 55° would be required to meet design cooling requirements. The operating speeds of fans in a VAV system are varied to vary the volume of conditioned air that is being supplied to the various zones at any given time, thereby keeping the temperature of the zones at a desired setpoint temperature of, for example, 72° F. as sensed by the thermostat in the zone. The 55° supply air temperature and the sensed temperature in the zone become controlling factors for the VAV system.

The first VAV air conditioning systems provided all cooling by mechanical means. Thus, the compressor and the heat exchange coil were required to be operated frequently in order to cool the air distributed throughout a building. This was true even when the outside ambient air was relatively cool. The compressors require relatively large amounts of energy for operation. As ways were sought to improve the efficiency and reduce the cost of cooling air, economizers were designed and installed on air conditioning systems. An economizer is a device that introduces outside air into the system to provide cooling when the ambient air has an energy level that makes this possible. Since VAV systems always supply air at a constant temperature of nominally 55° F., outside air is generally effective to assist in cooling at all times that the outside air temperature is less than 55° F.

Outside air is mixed by an economizer in a VAV System with the return air from the building cooling zones. The outside air is provided by the fans as cooled supply air to the ventilated zones. It will be appreciated that, as the temperature of the outside air is reduced, a much reduced volume of outside air is needed to cool the zones to a desired temperature. When the outside air is, for example, 10° F., very little outside air needs to be added to the return air to reduce the return air to 55° F. and to keep the zones at 72° F. In such conditions, the total air flow through the air conditioning system can typically be less than one third of the air conditioning system's full capacity, which occurs during 100% mechanical cooling.

The reduced volume of air flow at the lower outside air temperatures results in a problem called stratification in the supply ducts. This simply means that the return air and the outside air are not adequately mixed together prior to entry into the supply ducts. When the air in the main supply duct descending into the building becomes stratified, one side of the duct will have relatively warm return air in it while the other side of the duct has relatively much cooler outside air in it.

The problem of stratification is made worse in the more recent VAV systems that are of a side-by-side' design. Side-by-side VAV systems are designed to have return air enter the rooftop unit on one side of the unit and the outside air enter on the other side, as opposed to the "over and under" orientation of previous designs. The return air and the outside air each pass through a damper assembly and enter a common plenum, where mixing should occur. Side-by-side designs are preferable in that the air that is directed onto the coils of the evaporator is more uniform in temperature from the top to the bottom of the unit. The side-by-side design corrects some freezing problems experienced in the heat exchange coil with over-and-under designs. However, at low air flow rates, the side-by-side design results in the fans drawing the return air and the outside air through the plenum of the rooftop unit in unmixed parallel, side-by-side flows. The air then enters the descending supply ducts in a stratified, unmixed manner. The problem of stratification is even further exacerbated as rooftop designs are made ever wider in order to add additional cooling capacity. Current VAV systems may be between four and ten feet wide. The plenum necessarily becomes wider, making it more difficult to effect adequate mixing under low flow conditions.

As previously indicated, the temperature of the supply air as the supply air enters the main supply duct is an important controlling parameter for the VAV system. Measurement of the temperature is typically accomplished by means of a thermistor. The output of a thermistor is a resistance that varies with temperature. In order to obtain an average supply air temperature, a grid including a plurality of thermistors has been constructed utilizing pairs of series and parallel connected thermistors.

In order to obtain an output from the above described grid that has the same characteristics as a single thermistor, an equal number of series pairs of thermistors and parallel pairs of thermistors must be coupled together to obtain the desired averaging. Accordingly, the system may employ a single thermistor, or grids of four, eight, sixteen, etc. thermistors as desired to obtain the average temperature.

Obviously, the more thermistors in the grid that are utilized, the more accurate is the average output. Such grids have been mounted on a lattice formed of rods that are welded together and suspended over the mouth of the supply air duct. This method of mounting is rather complex and expensive to produce and install. Additionally, and more troublesome, is the fact that the failure of a single thermistor in a grid results in an open circuit, completely invalidating the output of the grid. To correct such a failure, the VAV system must be shut down and maintenance personnel must enter the VAV system enclosure and individually test each thermistor in the grid in order to determine which thermistor has failed.

It is a primary object of the present invention to provide an accurate average temperature sensor that is effective throughout the full range of air flow rates delivered by the VAV system to the supply air duct.

It is a further object of the present invention to minimize the complexity of the installation and maintenance of such sensor while retaining accurate temperature averaging.

It is another object of the present invention to provide a condition sensor arranged between a high and low pressure region such that a flow of air is passed over the sensor.

These and further objects of the present invention will become apparent from the following description of the preferred and alternate embodiments.

SUMMARY OF THE INVENTION

The present invention meets the foregoing objectives by providing a flow tube in which a flow of average temperature air is induced by being disposed in a high pressure region and having air inlets therein and an air outlet in a low pressure region. The air inlets are so disposed to intercept a representative sample of the air in the high pressure region. This air is mixed in the flow tube to provide an average temperature thereof. A single temperature sensor is disposed relative to the flow tube to sense the temperature of the mixed air flowing therein. The use of a single temperature sensor greatly simplifies fault detection and correction. Further, the flow tube utilized may be a readily available, commercial grade copper tube. Installation of the flow tube in the air conditioning is very simply accomplished, avoiding the need for the construction and installation of a sensor grid and supporting lattice work. The air inlets are all of the same diameter, making their formation relatively simple. The end result is a simple, reliable, inexpensive sensor system that adequately senses the average temperature of the supply air, which is a critical control variable for the air conditioning unit.

The average temperature sensor is designed for use in an air conditioning unit, wherein the air conditioning unit has a high pressure region and a low pressure region. The average temperature sensor senses the average temperature of air flowing in the high pressure region and comprises a device for conveying a flow of air that is in fluid communication with the high pressure region and the low pressure region and a temperature sensor that is disposed in a temperature sensing relationship to the device for conveying a flow of air in order to sense the temperature of the flow of air therein. The high pressure in the high pressure region induces a flow of air in the device for conveying a flow of air, which flow of air flows from the high pressure region to the low pressure region and is at the average temperature of the air in the high pressure region. The device for conveying a flow of air includes a plurality of air inlets selectively disposed within the high pressure region to receive a sample flow of air that has a temperature that is representative of the average temperature of the air flowing in the high pressure region. Both the arrangement of the inlet and the location of the device can be varied.

DETAILED DESCRIPTION OF THE DRAWINGS

Figure 1:
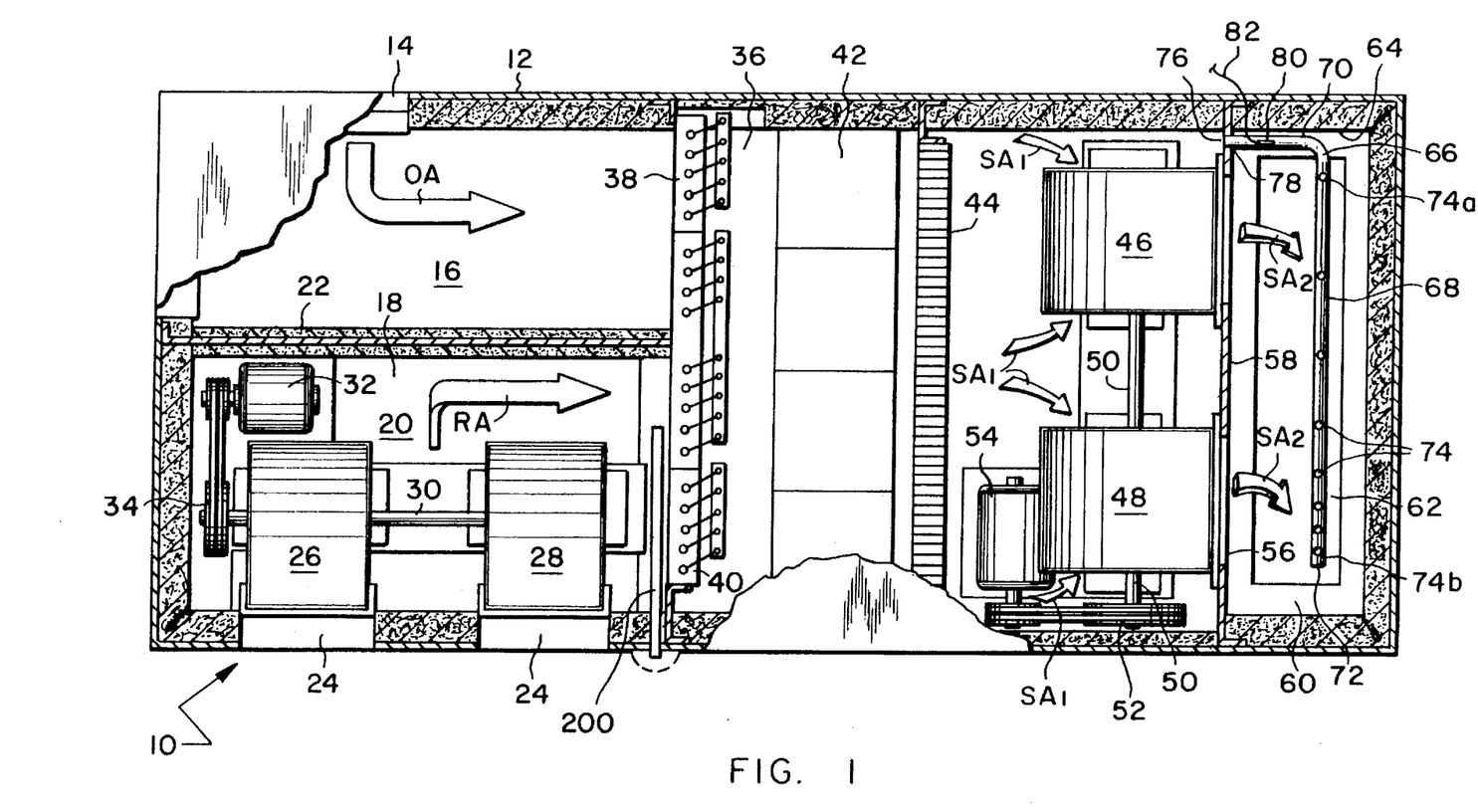
FIG. 1 is a top perspective view of a rooftop air conditioning system having an average temperature sensor assembly in accordance with the present invention installed therein, and with a portion of the exterior housing enclosure broken away to reveal the inner mechanisms of the system.

Referring to FIG. 1, air conditioning unit 10 includes a sheet metal housing 12 of generally rectangular configuration adapted for mounting on the roof of a building and enclosing the various mechanical and electrical components of unit 10. Housing 12 generally provides for a weather-tight enclosure that shelters the various mechanical components of the unit 10 from the elements. Housing 12 is designed to be installed on a rooftop and then left in the elements for many years of operation. A number of access panels (not shown) are included in housing 12 to provide maintenance access to the mechanical and electrical components housed therein. Representative air conditioning units 10 are shown in applicant's U.S. Pat. Nos. 5,324,229 to Weisbecker; 4,679,411 to Pearse, Jr.; 4,501,125 to Han; and 4,353,409 to Saunders et al., all of which are incorporated herein by reference.

Air conditioning unit 10 is an air recirculating type of device. Accordingly, air flows generally from a first end (at the left of the depiction of FIG. 1) of air conditioning unit 10 to second end thereof (at the right of the depiction of FIG. 1), where the conditioned supply air is circulated to the various heating and cooling zones of the building. Return air from the zones of the building enters the unit 10 at the first end thereof for recooling or reheating, as desired, and recirculation to the zones.

Air conditioning unit 10 includes an outside air inlet opening 14. Outside air inlet opening 14 is fluidly coupled to an outside air chamber 16 defined within unit 10. The outside air inlet opening 14 typically includes a grillwork that extends across opening 14 to minimize the intrusion of debris therein. Outside air chamber 16 is preferably a relatively large plenum that acts to straighten the flow of outside air into the remaining portions of unit 10. The flow of outside air is indicated in FIG. 1 by arrow OA.

Return air chamber 20 is disposed alongside outside air chamber 16. A return air duct opening 18 is located in the bottom wall of housing 12. The return air duct opening 18 is upwardly directed to facilitate the flow of return air into return air chamber 20. The return air duct opening 18 is in flow communication with the return air duct work (not shown) of the building that is being cooled or heated. Return air flows upward from the zones of the building into return air chamber 20 as indicated by arrow RA. Return air chamber 20 and outside air chamber 16 are separated by a fluid tight partition 22, such that there is no mixing of outside air and return air at this stage of unit 10.

The return air chamber 20 may include a return air exhaust ports 24. Under certain circumstances, it is desirable to exhaust a portion of the return air to the atmosphere rather than recooling such air and recirculating it to the building zones. Exhausting of the return air may be facilitated by centrifugal fans 26, 28. Fans 26, 28 are powered on a common drive shaft 30 by motor 32, acting through belt and pulley system 34.

FIG. 1 illustrates the side by side arrangement of the outside air and return air pathways that is favored in the design of the VAV type air conditioning units 10. Such units 10 are designed to have a relatively reduced height dimension of three to four feet as compares to the width dimension, which may be ten feet or more in order to accommodate greater volumes of air and increased heating and cooling capacity.

A common filter plenum 36 is fluidly coupled to both the outside air chamber 16 and the return air chamber 20. The flow of outside air and return air into common filter plenum 36 is controlled by damper assemblies 38, 40. Damper assemblies 38, 40 are preferably moveable to independently control the flow of outside air and return air into common filter plenum 36 as desired. For example, during periods of operation in which all the return air is being exhausted by fans 26, 28, the damper assembly 40 will be in the closed position. The mixing ratio of return air and outside air is typically a function of the enthalpy of the outside air as compared to the enthalpy of the return air and the need to intake fresh outside air in order to maintain the indoor air quality at a desired level.

The common filter plenum 36 contains filters 42. The filters 42 are of the flow through type, such that the outside air and return air flow from the left to the right as depicted in FIG. 1 during the filtration process. Filters 42 may be readily replaced as needed.

After filtration the air flows through heat exchange coil 44. Heat exchange coil 44 provides for conditioning of the air flowing therethrough by connection to a source of steam or heated or chilled water, to the evaporator of a direct expansion refrigeration system, to the indoor coil of a vapor-compression type heat pump system or to any other known heating or cooling device or medium. The air flowing through the heat exchange coil 44 is conditioned (heated or cooled) as desired and is thereafter known as the supply air. Under certain circumstances the cooling of the building zones is provided by the use of outside air without the need for mechanical cooling as provided by the heat exchange coil 44. This is the most economical and desirable mode of cooling.

The supply air is captured by fans 46, 48. The fans 46, 48 are powered by a common shaft 50 that is in turn driven through the belt and pulley system 52 by motor 54. Other motor, driving and shaft arrangements are also contemplated. The fans 46, 48 each have inlets (not shown) that are located in the side portions thereof to facilitate the entry of the supply air as indicated by the arrows SA1. The fans 46, 48 each have exhausts 56 that discharge the accelerated supply air as indicated in FIG. 1 by the arrows SA2. The inlets of the fans 46, 48 are fluidly separated from the exhausts 56 thereof by plenum wall 58.

Plenum wall 58 fluidly separates the common filter plenum 36 from the supply air plenum 60. As a result of the action of the fans 46, 48 in accelerating the supply air SA2, the air pressure in supply air plenum 60 is greater than the air pressure in the common filter plenum 36.

Supply air plenum 60 is fluidly coupled to the supply duct work that supplies conditioned air to the building zones by supply air duct mouth 62 formed in the portion of the bottom side of housing 12 that forms the bottom of supply air plenum 60. Typically, the supply air duct mouth 62 has a width that is somewhat less than the width of the supply air plenum 60 as measured from the interior sidewalls 64, but that spans a substantial portion of the distance between the interior sidewalls 64.

The supply air is made up of return air and outside air. Without adequate mixing of the return air and the outside air, the supply air becomes stratified, with the outside air entering the upper portion of the supply air duct mouth 62 and the return air entering the lower portion of the supply air duct mouth 62, as depicted in FIG. 1. The aforementioned stratification of the supply air is evidenced as a varying temperature across the width of the supply air duct mouth 62. Supply air flows downward through the duct mouth 62 and into the building, as depicted by the supply arrows SA2. It is desirable for control of the air conditioning unit 10 to measure the average temperature of the supply air, preferably as the supply air flows through the duct mouth 62. The present invention utilizes a flow tube 66 to make the average supply air temperature measurement.

The flow tube 66 is preferably an L shaped tube having a first leg 68 that is disposed to span substantially the full width of the supply air duct mouth 62 and a second leg 70 that fluidly couples the first leg 68 to the common filter plenum 36. The flow tube 66 preferably has a circular cross section and is made of a relatively thin walled metallic material, such as copper. The inside diameter of the flow tube 66 is preferably approximately 1 inch (2.54 cm) in diameter, but the flow tube may have an inside diameter of between ¼ inch to 2 inches (0.635 cm to 5.08 cm). The inside diameter is preferably constant throughout the full span of flow tube 66 although graduated tubing or the like may be used if desired. This permits the use of readily available copper tubing having such constant inside diameter in the construction of flow tube 66.

The first leg 68 of the flow tube 66 is fluidly sealed at the end 72. A series of air inlets 74 are formed in the wall of flow tube 66. The air inlets 74 extend from the exterior of flow tube 66 through the wall thereof to the interior air passageway that is formed by flow tube 66. In a preferred embodiment, the total area of all the air inlets 74 is less than the cross sectional area formed by the inside diameter of flow tube 66. This aids in generating an efficient air flow in flow tube 66.

Figure 7:
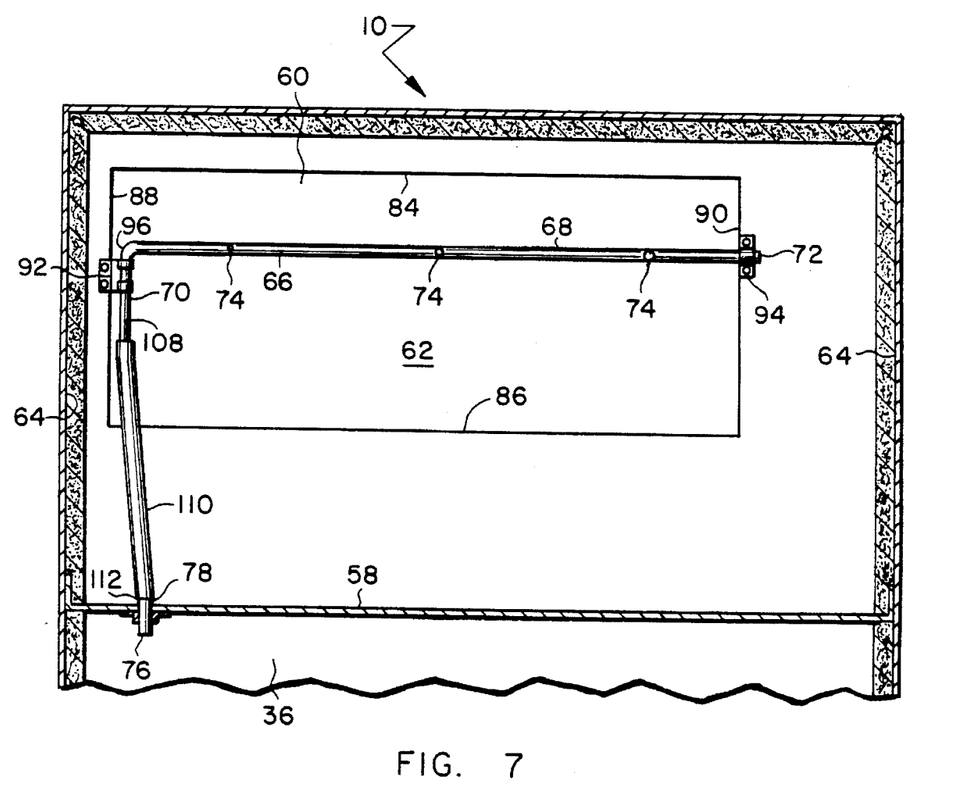
FIG. 7 is an alternate embodiment of FIG. 2 showing holes of increasing size.

The spacing of the air inlets 74 along the flow tube 66 is dependent on the distance of a given air inlet 74 from the open end 76 of the second leg 70 of flow tube 66. The spacing between adjacent air inlets 74 is less the further the specific air inlet 74 is from the open end 76. This reduced spacing accounts for the reduced pressure differential that exists at the air inlets 74 that are more distant from open end 76 and ensures approximately equal air flow from all portions of first leg 68 of flow tube 66. Alternatively, the air inlets 74 can be regularly spaced along the flow tube 66 and the area of the air inlets 74 can be increased with the proximity of the respective air inlet 74 to the end 72 (see FIG. 7).

Figure 6:
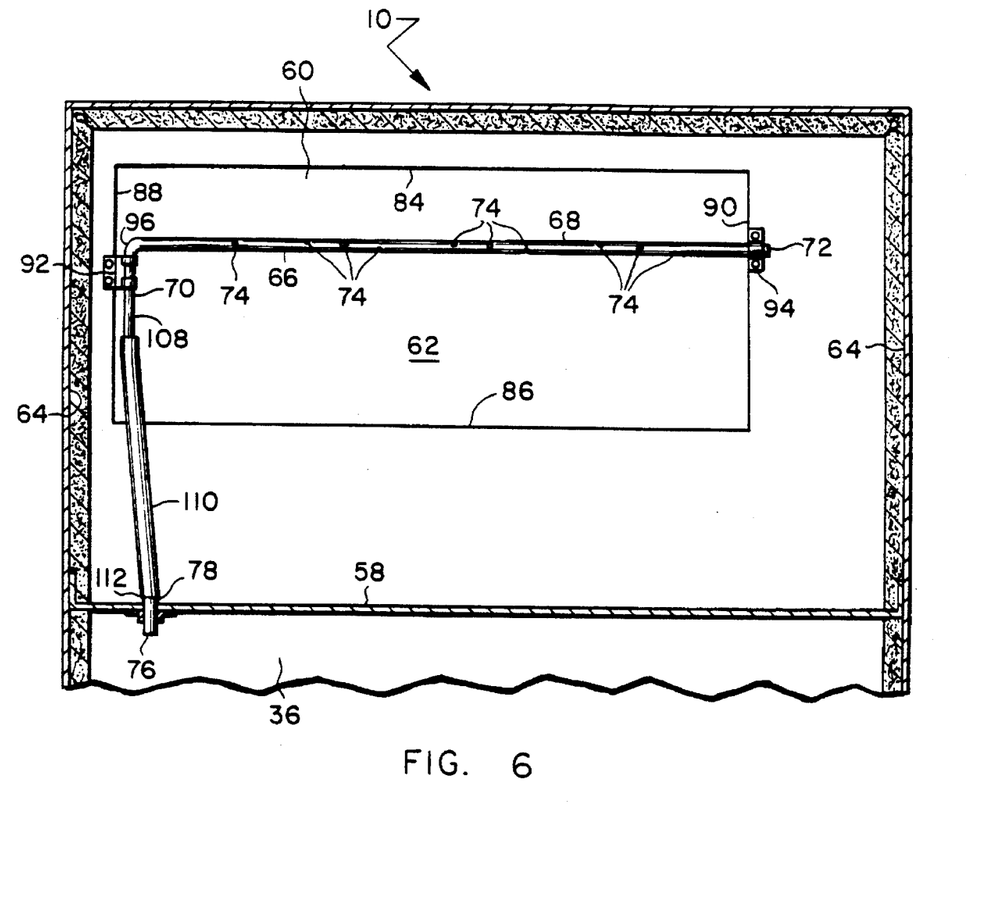
FIG. 6 is an alternate embodiment of FIG. 2 showing nonlinear holes.

The arrangement of the air inlets 74 is preferably linear and facing into the airflow, although non-linear arrangements spiraling around or spaced irregularly around the flow tube 66 are also contemplated (see FIG. 6).

The air inlets 74 are preferably directed to open into the flow of supply air in order to facilitate the flow of supply air therethrough. In the depicted embodiment, the air inlets 74 are upwardly directed, since the flow of supply air is downward into supply air duct mouth 62. The length of the first leg 68 of the flow tube 66 is readily adapted to the various widths of the supply duct mouth 62 found in air conditioning units 10 of varying width.

As indicated above, the end 76 of second leg 70 is open. Additionally, end 76 is open into common filter plenum 36. Flow tube 66 projects through an opening (not shown) in plenum wall 58. The outside surface of flow tube 66 is in sealing engagement with the plenum wall 58 that fluidly separates the common filter plenum 36 from the supply air plenum 60 in order to maintain a fluid tight seal therebetween. The described seal is maintained at the point of intersection, indicated at 78.

A single temperature sensor 80 is installed within the second leg 70 of flow tube 66. The temperature sensor 80 is preferably disposed proximate the end 76 of the second leg 70 and positioned to be affected by the flow of air in flow tube 66. The temperature sensor 80 is preferably of the thermistor, bulb type, in which the temperature is represented by the varying resistance of the sensor 80. Such resistance changes as a function of the sensed temperature of the air flowing past sensor 80. A lead 82 passes through the wall of flow tube 66 and is connected to the control system (not shown) of the air conditioning unit 10. It is understood that other types of temperature sensors may be satisfactorily utilized. Such temperature sensors may disposed either invasively or noninvasively with respect to flow tube 66. It is also understood that humidity sensors, carbon dioxide sensors, volatile organic compound sensors and various indoor air quality sensors may be substituted for or combined with the temperature sensor 80.

Figure 2:
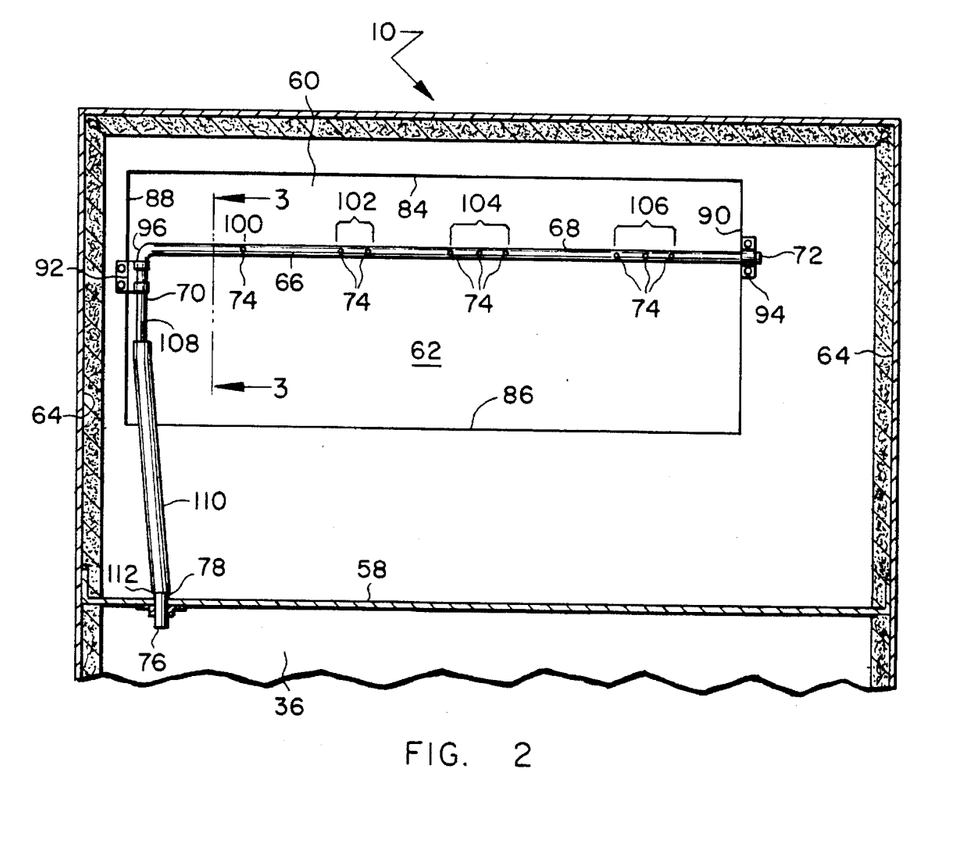
FIG. 2 is a top perspective view of the supply air portion of a rooftop air conditioning system having an average temperature sensor assembly in accordance with the present invention installed therein.

FIG. 2 depicts an alternative configuration of supply air plenum 60 of air conditioning unit 10 with a flow tube 66 of the present invention installed therein. Supply air plenum 60 has a supply air duct mouth 62 formed in the bottom wall thereof. Supply air duct mouth 62 is rectangular in shape and bounded by first opposed sides 84, 86 and second opposed sides 88, 90. The supply air plenum 60 as depicted in FIG. 2 is designed for use with an air conditioning unit 10 that provides between 20 and 50 tons of cooling capacity. Such capacity requires a generous opening at supply air duct mouth 62. Accordingly, first opposed sides 84, 86 are approximately five feet in length and second opposed sides 88, 90 are approximately three feet in length. Flow tube 66 preferably has an outside diameter of 0.875 inches and an inside diameter of 0.785 inches.

Flow tube 66 is suspended on brackets 92, 94 such that the first leg 68 of flow tube 66 spans substantially the full, long dimension of supply air duct mouth 62 as defined by first opposed sides 84, 86. First leg 68 of flow tube 66 is substantially parallel with the first opposed sides 84, 86 of supply air duct mouth 62. Flow tube 66 has a right angle bend 96 that is located proximate second opposed side 88. Right angle bend 96 defines the juncture of first leg 68 and second leg 70 of flow tube 66.

In the depicted embodiment, first leg 68 of flow tube 66 is approximately five feet in length. First leg 68 includes a plurality of upwardly directed air inlets 74. There are four groups 100, 102, 104 and 106 of air inlets 74 disposed along the span of first leg 68 of flow tube 66. Group 100 is located closest to the reduced pressure that is in filter plenum 36. Group 100 consists of a single air inlet 74 and experiences the greatest pressure differential of all the air inlets 74 disposed along first leg 68.

Group 102 consists of two air inlets 74. The air inlets 74 of group 102 are disposed approximately three inches from each other and are preferably one foot upstream (toward sealed end 72) from the air inlet 74 of group 100. Group 104 is comprised of three air inlets 74. They are located approximately three inches apart. Group 104 is located approximately one foot upstream from group 102. The final group of air inlets 74 is group 106. Group 106 is comprised of three air inlets 74 that are located approximately three inches apart. Group 106 is located approximately one foot upstream from group 104. The rightmost air inlet 74 of group 106 is the furthest air inlet 74 from the reduced air pressure that exists in filter plenum 36. Accordingly, such air inlet 74 will experience the least differential pressure and the least air flow therethrough as compared to the other air inlets 74. The spacing of the groups 100, 102, 104, and 106 along the span of first leg 68 in conjunction with the generally increasing number of air inlets 74 in each such group compensates for the decreased pressure differential and the air flow that exists in the upstream direction in flow tube 66.

In the depicted embodiment, each of the air inlets 74 is preferably of 0.257 inch diameter and the inside diameter of flow tube 66 is preferably 0.785 inches. Accordingly, the combined area of the nine air inlets 74 gives a total air inlet area that is less than the area of the inside diameter of flow tube 66. As indicated, by keeping the total area of the air inlets 74 less than the area of the inside diameter of flow tube 66 promotes an efficient air flow through flow tube 66.

The second leg 70 of flow tube 66 is relatively short in length as compared to first leg 68. Second leg 70 in the embodiment depicted is approximately one foot in length. Second leg 70 includes mounting bore 108 for the mounting of temperature sensor 80 therein.

In the embodiment depicted in FIG. 2, a plastic tube 110 is utilized to fluidly connect flow tube 66 to filter plenum 66. Plastic tube 110 is slipped over the end of second leg 70 and affixed thereto by a wire tie or a hose type clamp. Plastic tube 110 is sealably coupled to plenum wall 58 at 78 by a bushing 112 disposed in plenum wall 58. The open end 76 of plastic tube 110 opens into filter plenum 36.

Figure 3:
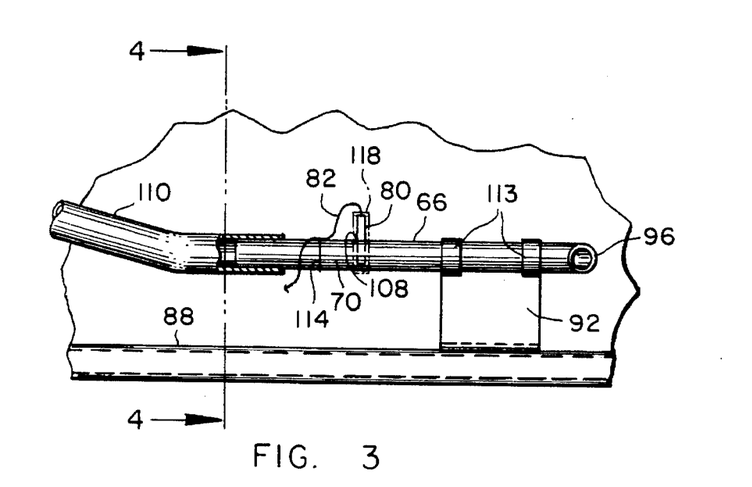
FIG. 3 is a sectional view of an average temperature sensor assembly taken along line 3—3 of FIG. 2.

FIG. 3 is a depiction of second end 70 of flow tube 66 coupled to plastic tube 110. Flow tube 66 is supported approximately three inches above second opposed side 88 of supply air duct mouth 62 by bracket 92. Flow tube 66 is retained atop bracket 92 by clamps 113. Clamps 113 are metallic and have an inner rubber grommet that absorbs vibration generated by the operation of air conditioning unit 10. Temperature sensor 80 is depicted disposed within mounting bore 108 such that the portion of temperature sensor 108 depicted in phantom protrudes into the interior air passageway of flow tube 66. Lead 82 is shown held in place on flow tube 66 by wire tie 114.

Plastic tube 110 is shown slipped over the end of second leg 70 of flow tube 66. Plastic tube 110 has an inside diameter that is very slightly greater than the outside diameter of flow tube 66, in order to facilitate the ready emplacement of plastic tube 110 on flow tube 66. Plastic tube 110 is relatively resilient and is bendable through shallow angles. Such shallow angle bends do not materially alter the inside diameter of plastic tube 110. Thus, plastic tube 110 can be routed around any intervening machinery and yet not affect the flow of supply air therein.

Figure 4:
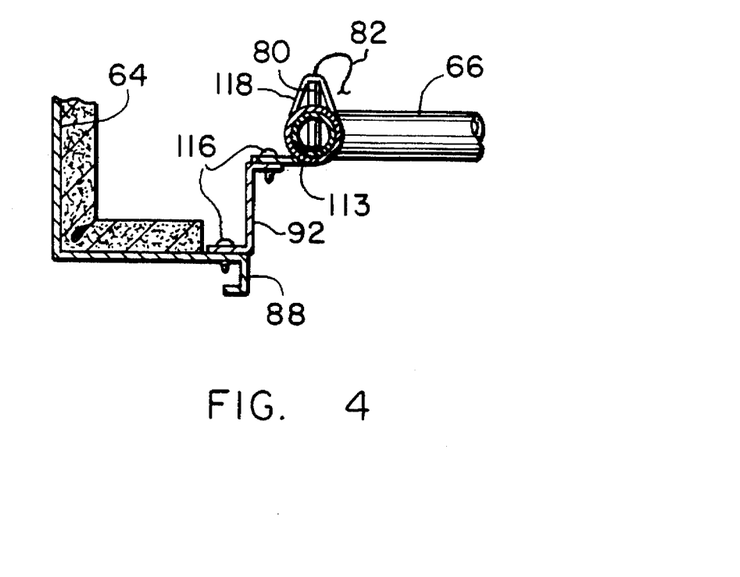
FIG. 4 is a sectional view of an average temperature sensor assembly taken along line 4—4 of FIG. 3.

FIG. 4 depicts flow tube 66 mounted to bracket 92. Clamp 113 is shown surrounding the exterior diameter of flow tube 66 with a tail that is secured to bracket 92 by sheet metal screw 116.

Temperature sensor 80 is shown disposed partially within the interior area of flow tube 66. An expandable, rubberized retaining wrap 118 is positioned around temperature sensor 80 and the underside of flow tube 66 to retain temperature sensor 80 therein. Bracket 92 is depicted affixed to the edge of second opposed side 88 of supply air duct mouth 62 in a conventional manner by sheet metal screw 116.

In operation, supply air is taken into fans 46, 48 through air inlets and accelerated thereby. Ideally, return air and outside air are thoroughly mixed in common filter plenum 36. This is rarely the case in practice, however. In practice, the supply air may be stratified and exhibit a non uniform temperature throughout, as previously described. The accelerated supply air, SA2, is discharged from the fans 46, 48 into supply plenum 60. The operation of the fans 46, 48 in drawing supply air from the common filter plenum 36 and ejecting the supply air into the supply plenum 66 at relatively high velocity creates a condition of higher air pressure in the supply plenum 60 than exists in the common filter plenum 36. The higher pressure in the supply plenum 60 induces the flow of supply air in the flow tube 66. Effectively, the fans 46, 48 act as pumps to pump a flow of supply air into air inlets 74 and through the flow tube 66, past temperature sensor 80 to exhaust into common filter plenum 36.

The flow of supply air is drawn from the air inlets 74, displaced across the full span of first leg 68. The aforementioned spacing of the air inlets 74 ensures that the amount of air drawn from the furthest portion thereof, proximate air inlet 74b, as depicted in FIG. 1, is approximately the same as that which is drawn from the portion nearest outlet 76, proximate first air inlet 74a. This is also true for air drawn into the air inlets 74 of group 104 as compared to the air inlet 74 of group 100, as depicted in FIG. 2. Such spacing accounts for the lesser pressure differential that results proximate the air inlet 74b as compared to the air inlet 74a and ensures that the air flow in flow tube 66 is representative of the average supply air that is entering the air supply duct mouth 62.

As the air flows through the flow tube 66 from the first air inlet 74b or inlet 74 of group 104, such air is thoroughly mixed with the supply air that enters each succeeding inlet 74. Such thorough mixing results in the temperature of the air flow as sensed by sensor 80 being the average temperature of the supply air.

The diameter of the flow tube 66 is selected based on tests with a given air conditioning unit 10 under all operating conditions. The diameter is adequate to ensure adequate flow over the sensor 80 to sense the average temperature of the supply air, even when the fans 46, 48 are operating at less than the designed minimum operating conditions. Such conditions result in the least pressure differential between the supply plenum 60 and the common filter plenum 36. It is under such conditions that the least air flow is induced in the flow tube 66.

Figure 5:
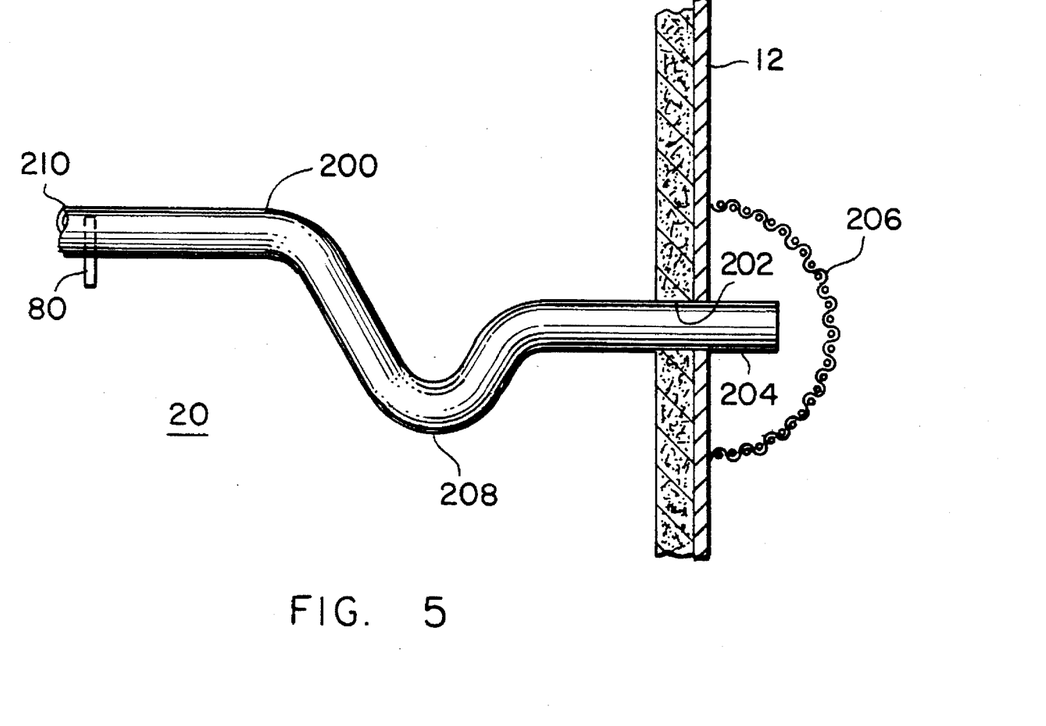
FIG. 5 is an alternative embodiment of the present invention and is used to measure outside air temperature.

FIG. 5 is an alternative embodiment of the present invention where the location of the flow tube 200 is moved to measure outside air. This is accomplished by positioning the flow tube 200 through an aperture 202 in the housing 12 and locating the flow tube 200 in the return air chamber 20. An outside end 204 of the flow tube 200 projects through the housing 12 and is open to outside air. A screen 206 prevents objects from entering the flow tube 200 through the open outside end 204. The flow tube 200 is formed with a P-trap 208 to prevent condensate from entering the air conditioning unit 10. Since air is being exhausted from the return air chamber 20 through the exhaust ports 24, the pressure in the return air chamber 20 is low relative to the pressure of the outside air. Additionally, an interior end 210 of the flow tube 200 is located adjacent the return air stream so that the return air stream pulls air from the flow tube 200 by induction. This causes a flow of outside air through the open outside air end 204 across the temperature sensor 80 and through the end 210 into the return air stream. The temperature sensor 80 can be positioned anywhere in the flow tube 200 and the outside air temperature need not be averaged since it is presumed to be thoroughly mixed.

While the present invention has been described in the context of a preferred embodiment, it is also appreciated that there are many modifications and variations that are within the scope of the present invention so that its breadth should in no way be limited other than by the claims that follow.

I claim:

1. In an air conditioning unit having a high pressure region and a low pressure region, a temperature sensor for sensing the average temperature of the air flow in the high pressure region, comprising:

a conveying device having structure defining an air passageway and spanning a substantial portion of the high pressure region, said structure defining a plurality of air inlets opening into said air passageway, the conveying device including an air outlet at a downstream end of said air passageway, the air outlet being fluidly coupled to the low pressure region; and a sensor sensing air temperature disposed downstream of said air inlets and in a temperature sensing relationship to the conveying device such that the temperature of air flowing from said air inlets in said air passageway affects said air temperature sensor wherein the high pressure in the high pressure region induces a flow of air into the air inlets and through the air passageway to exhaust through the air outlet into the low pressure region.

2. An average temperature sensor as claimed in claim 1, wherein the air conditioning unit further includes at least one fan disposed between the low pressure region and the high pressure region and delivering an accelerated flow of air from the low pressure region to the high pressure region, said at least one fan generating the high pressure in the high pressure region and acting to pump the flow of air into the air inlets of the conveying device.

3. An average temperature sensor as claimed in claim 2, the low pressure region further including a return air chamber separated from outside air by a housing, and the conveying device being disposed through the housing between the return air chamber and the outside air.

4. An average temperature sensor as claimed in claim 2, the air conditioning unit further including a supply air duct mouth disposed in the high pressure region designed to deliver a flow of conditioned air from the high pressure region to supply ducts in a building, wherein the conveying device is disposed to substantially span the supply air duct mouth such that the air inlets defined therein are positioned relative to the supply air duct mouth to intercept a portion of the flow of conditioned air into the supply air duct mouth.

5. An average temperature sensor as claimed in claim 4, wherein the conveying device is a tube defining the air passageway therein and having a first end fluidly sealed, said first end being disposed in the high pressure region and a second end being open and defining the air outlet thereof, said second end opening into the low pressure region.

6. An average temperature sensor as claimed in claim 5, further including the at least one fan operating in a range between a low speed condition and a high speed condition, and generating an air flow through the tube and into the low pressure region throughout the operating range of the at least one fan.

7. An average temperature sensor as claimed in claim 6, wherein each of the air inlets that comprise the plurality of air inlets opening into said air passageway is of substantially equal area.

8. An average temperature sensor as claimed in claim 7, wherein the plurality of air inlets opening into said air passageway are spaced such that the air inlets compensate for the reduced air pressure occurring proximate the first sealed end of the tube as compared to the air inlets being disposed more proximate the air outlet of the tube.

9. An average temperature sensor as claimed in claim 8 wherein distance between each of the plurality of all inlets decreases as the proximity of the respective air inlet to the first end decreases.

10. An average temperature sensor as claimed in claim 6 wherein each of the air inlets has an area which increases with the respective air inlets proximity to the first end.

11. An average temperature sensor as claimed in claim 10, wherein the plurality of air inlets are regularly spaced.

12. An average temperature sensor as claimed in claim 1, wherein the air temperature sensor is disposed within said air passageway defined within the conveying device.

13. An average temperature sensor as claimed in claim 12, wherein the air temperature sensor is a thermistor type sensor.

14. An average temperature sensor designed for use in an air conditioning unit, the air conditioning unit having a high pressure region and a low pressure region, the average temperature sensor sensing the average temperature of air flowing in the high pressure region, comprising:
 a conveying device in fluid communication with the high pressure region and the low pressure region and having a plurality of air inlets disposed to intercept a representative portion of the air flowing in the high pressure region; and
 an air temperature sensor disposed in a temperature sensing relationship with the conveying device to sense the temperature of the flow of air therein,
 wherein the high pressure in the high pressure region induces a flow of air in the conveying device, said flow of air flowing from the high pressure region to the low pressure region and being at the average temperature of the air in the high pressure region.

15. An average temperature sensor as claimed in claim 14, wherein the conveying device includes a first end disposed in the high pressure region and wherein the plurality of air inlets are selectively disposed within the high pressure to receive a sample flow of air that has a temperature that is representative of the average temperature of the air flowing in the high pressure region.

16. An average temperature sensor as claimed in claim 15, wherein the plurality of air inlets are of equal area and are spaced to compensate for the reduced air pressure occurring proximate the first end.

17. An average temperature sensor as claimed in claim 15 wherein the plurality of air inlets are regularly spaced and the area of the air inlets is varied to compensate for the reduced pressure occurring proximate the first end.

18. An average temperature sensor as claimed in claim 17 wherein the high and low pressure regions are separated by a fan and the high pressure region includes a supply air plenum.

19. An average temperature sensor as claimed in claim 17 wherein the high and low pressure regions are separated by a fan and the low pressure region includes a return air chamber.

20. A method for sensing average temperature in an air conditioning unit, the air conditioning unit having a high pressure region and a low pressure region, the method being for sensing the average temperature of air flowing in the high pressure region, comprising the steps of:
 inducing a flow of air conveying a sample of air from the high pressure region to the low pressure by means of the pressure differential between the high pressure region and the low pressure region;
 collecting the sample of air at selected points within the high pressure region such that the flow of air conveyed is at a temperature that is representative of the average temperature of the air in the high pressure region; and
 sensing the temperature of the air sample being conveyed from the high pressure region to the low pressure.

21. In an air conditioning unit having a high pressure region and a low pressure region, a condition sensor for sensing a condition of the airflow in the high pressure region, comprising:
 a conveying device having a first end disposed in the high pressure region, a second end disposed in the low pressure region, and structure connecting the first and second ends; and
 a condition sensor disposed in the device for sensing a condition of air conveyed through the device from the high pressure region to the low pressure region;
 wherein the sensor includes a plurality of inlets associated with the first end and spanning a substantial portion of the high pressure region; and
 wherein the distance between each of the plurality of air inlets decreases as the distance between the respective air inlet and the first end decreases.

22. The condition sensor of claim 21 wherein the plurality of air inlets are linearly arranged.

23. The condition sensor of claim 21 wherein the plurality of air inlets are arranged in a non-linear arrangement.

24. The average temperature sensor as claimed in claim 21 wherein the air conditioning unit further includes at least one fan disposed between the low pressure region and the high pressure region and delivering an accelerated flow of air from the low pressure region to the high pressure region, said at least one fan inducing airflow in the device.

25. The average air temperature sensor as claimed in claim 24 wherein the low pressure region includes a return air chamber separated from outside air by a housing and the conveying device is positioned through an aperture in the housing so that the first end is open to outside air and the second end is open to return air.

\* \* \* \* \*